T. H. THOMAS.
LOAD BRAKE APPARATUS.
APPLICATION FILED SEPT. 3, 1919.
1,390,593.
Patented Sept. 13, 1921.
2 SHEETS—SHEET 1.
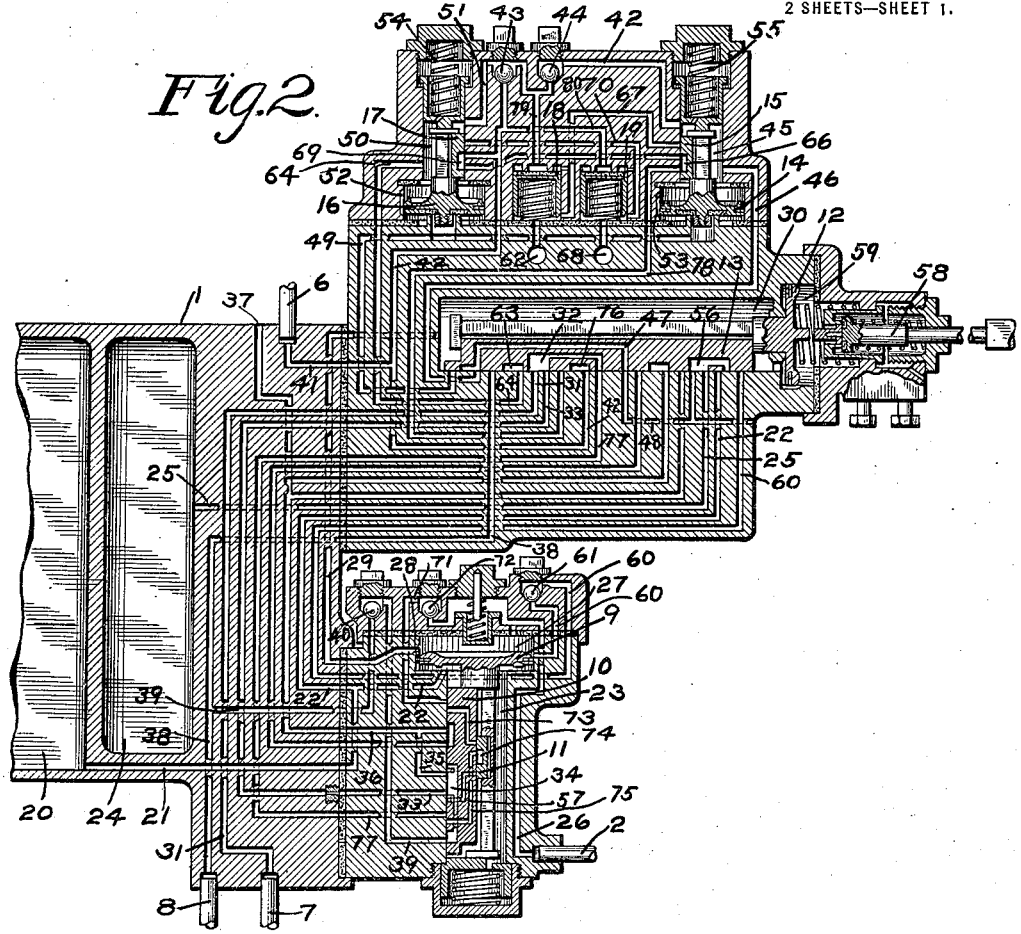
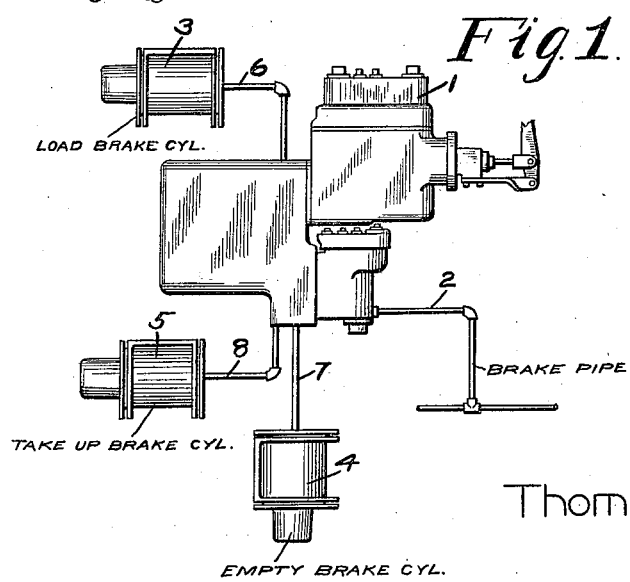
INVENTOR
Thomas H. Thomas
BY *Wm. M. Cady*
ATTORNEY

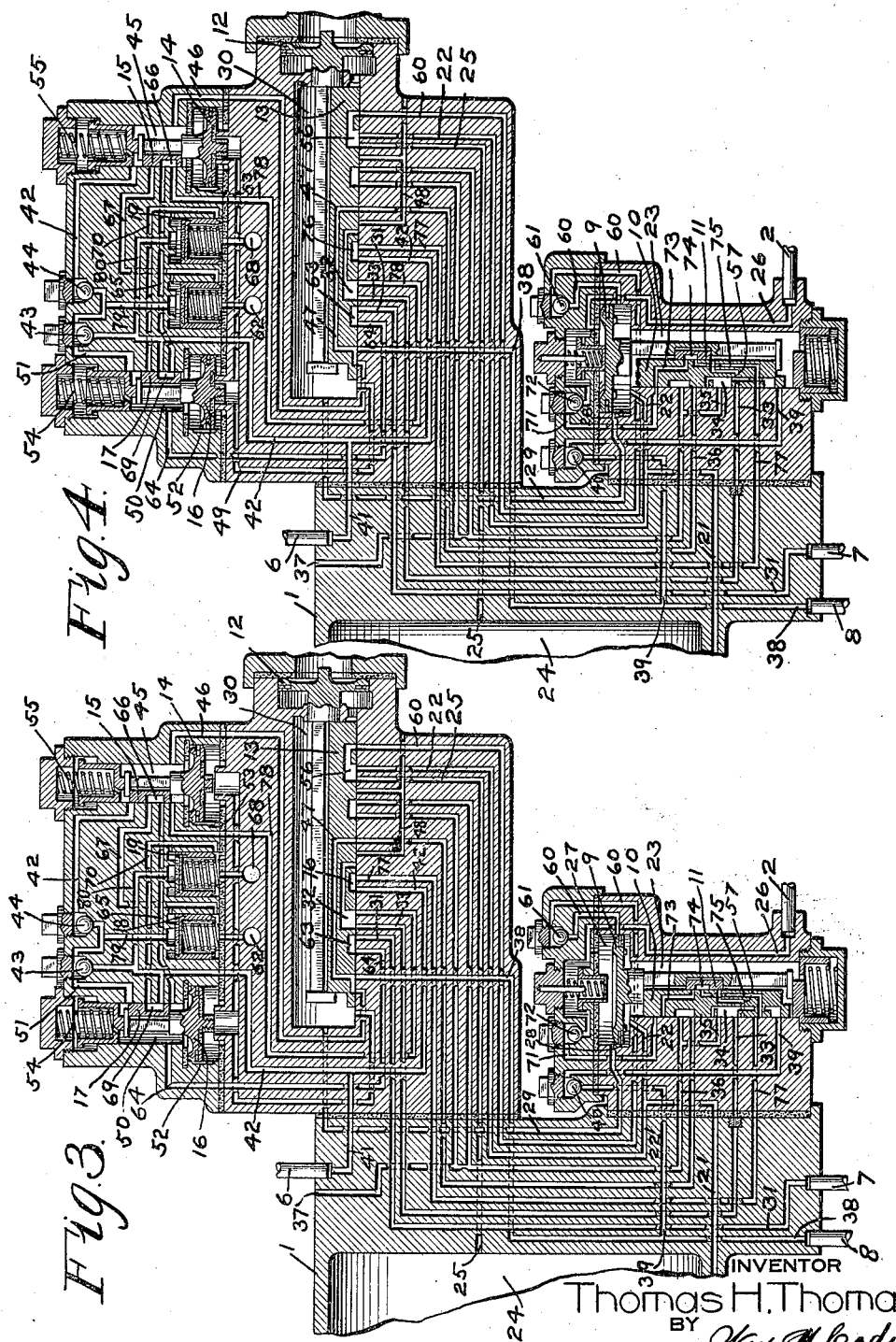

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOAD-BRAKE APPARATUS.

1,390,593.          Specification of Letters Patent.      Patented Sept. 13, 1921.

Application filed September 3, 1919. Serial No. 321,399.

*To all whom it may concern:*

Be it known that I, THOMAS H. THOMAS, a citizen of the United States, residing at Edgewood, in the county of Allegheny and State of Pennsylvania, have invented new and useful Improvements in Load-Brake Apparatus, of which the following is a specification.

This invention relates to fluid pressure brakes, and more particularly to a brake equipment in which the braking power may be regulated according as the car is empty or loaded.

The principal object of my invention is to provide an improved empty and load brake equipment of the above character.

In the accompanying drawings; Figure 1 is a diagrammatic view of a car empty and load brake equipment; Fig. 2 a central sectional view of a valve mechanism, embodying my invention, for controlling the brakes according to the load on the car and showing the parts in release position, and adjusted for empty car braking; Fig. 3 a view similar to Fig. 2, showing the parts in release position, and adjusted for load braking; and Fig. 4 a similar view, showing the parts in brake applied position and adjusted for load braking.

As shown in Fig. 1 of the drawings, the car brake equipment may comprise a controlling valve mechanism 1, connected to the usual brake pipe 2, a load brake cylinder 3, an empty brake cylinder 4, and a take-up brake cylinder 5, connected by the respective pipes 6, 7, and 8 to the valve mechanism 1.

The actual brake cylinder construction may be the same as that shown in Patent No. 1,297,513, of W. V. Turner, dated March 18, 1919, but for the purposes of the present invention, the brake cylinders are shown merely as brake cylinders of the usual construction.

The controlling valve mechanism 1 may include a triple valve device having a piston 9 for operating a main slide valve 10 and a graduating slide valve 11, a change-over valve device having a piston 12 for operating a slide valve 13, a valve device for controlling the admission of fluid to the empty brake cylinder having a piston 14 for operating a slide valve 15, a valve device for controlling the admission of fluid to the load brake cylinder, having a piston 16 for operating a slide valve 17, and valve pistons 18 and 19.

The casing of valve mechanism 1 also includes an auxiliary reservoir chamber 20, connected by passages 21 and 22 to valve chamber 23 of the triple valve device and a load reservoir chamber 24, having a passage 25 leading to the seat of the change-over slide valve 13.

With the change-over valve device in empty position, as shown in Fig. 2 of the drawings and the triple valve device in release position, the parts are charged with fluid under pressure from the brake pipe 2 through passage 26 to piston chamber 27 of the triple valve device and thence fluid flows through the usual feed groove 28 to valve chamber 23.

Fluid then flows from valve chamber 23 through passages 22 and 21 to auxiliary reservoir chamber 20 and through passage 29 to valve chamber 30 of the change-over valve device.

The empty brake cylinder 4 is connected to the exhaust through pipe 7, passage 31, cavity 32 in slide valve 13, passage 33, cavity 34 in slide valve 10, and passages 35, 36, and 37, and the take-up brake cylinder 5 is connected to the exhaust through pipe 8, passage 38, passage 39 past check valve 40, and cavity 34 in slide valve 10. The load brake cylinder 3 is connected to the exhaust through pipe 6, passage 41, passage 42, past check valves 43 and 44, to valve chamber 45 and thence through passage 46, cavity 47 in slide valve 13 to exhaust passage 48.

Passage 49, leading from the outer faces of the pistons 14 and 16, is blanked by the slide valve 13, while valve chamber 45 is open to the exhaust through passage 46 and valve chamber 50 is also connected to the exhaust through passage 51, passage 42 past check valve 44, to valve chamber 45.

Possible fluid pressure in passage 49 will be vented to valve chambers 50 and 45 through grooves 52 and 53 around the respective pistons 16 and 14, so that the springs 54 and 55 will maintain said pistons in the positions shown in Fig. 2 of the drawings.

The load reservoir chamber 24 is connected to the exhaust through passage 25, cavity 56 in slide valve 13 and passage 48.

When the brake pipe pressure is reduced in the usual manner to effect an application of the brakes, the triple valve piston 9 will move the main slide valve 10 and the graduating valve 11 so that the service port 57 will register with passage 33. Fluid under pressure will then be supplied from valve chamber 23 and the auxiliary reservoir chamber 20 through passage 33, cavity 32 in slide valve 13 and passage 31 to the empty brake cylinder 4, so that in the empty position of the parts, fluid is supplied only to the empty brake cylinder.

If the car is loaded, the mechanism is adjusted to load position by pulling out the rod 58, so that fluid is vented from piston chamber 59 of the change-over piston 12 and said piston is then shifted to its outer position by fluid pressure in valve chamber 30, as shown in Fig. 3 of the drawings.

In this position, the passage 49 is uncovered by the movement of slide valve 13, so that fluid is supplied from valve chamber 30 to the outer faces of the pistons 14 and 16 and said pistons are then shifted to their outer positions, as shown.

The load reservoir chamber 24 is now charged with fluid under pressure from valve chamber 23, through passage 22, cavity 56 in change-over slide valve 13 and passage 25, and also from the brake pipe when the triple valve piston 9 is in release position, through passage 60, past check valve 61 and cavity 56 in slide valve 13.

The empty brake cylinder 4 is now connected to an exhaust port 62, controlled by the valve piston 18, through passage 31, cavity 63 in slide valve 13, passage 64, valve chamber 50, passage 65, cavity 66 in slide valve 15, and passage 67.

The load brake cylinder 3 is connected to an exhaust port 68, controlled by valve piston 19, through passage 41, passage 42, cavity 69 in slide valve 17, and passage 70.

By means of the above construction, possible leakage into the empty and the load brake cylinders will be vented directly to the atmosphere, instead of depending upon the usual leakage grooves in the brake cylinders, for taking care of leakage.

When the brake pipe pressure is reduced to effect a service application of the brakes, with the parts in load position, the initial movement of the triple valve parts produces quick service by venting fluid from the brake pipe to the load brake cylinder 3 through passage 71, past check valve 72, port 73 in slide valve 10, cavity 74 in graduating valve 11, port 75 in slide valve 10, passage 77, cavity 76 in slide valve 13, and passages 42 and 41. Since the load brake cylinder 3 is now connected to the atmosphere, as hereinbefore described, the quick service venting of fluid from the brake pipe will be to the atmosphere.

In service position of the triple valve parts, fluid is supplied to the take-up brake cylinder 5 through the service port 57, passage 33, cavity 32 in slide valve 13, passage 78, through valve chamber 45 to passage 46, cavity 47 in slide valve 13, and passage 38, and it will be noted that since the load reservoir chamber 24 is now charged with fluid under pressure and is connected to valve chamber 23, the effective auxiliary reservoir volume will be the auxiliary reservoir chamber 20 plus the load reservoir chamber 24.

Since fluid supplied to the take-up brake cylinder flows through valve chamber 45, the inner face of piston 14 is subject to the pressure of fluid supplied to the brake cylinder and when said pressure plus the pressure of spring 55 slightly exceeds the fluid pressure acting on the opposite face of the piston 14, said piston will be shifted to its outer position, in which the slide valve 15 establishes communication from the auxiliary reservoir volume to the empty brake cylinder 4 through service port 57, passage 33, cavity 32 in slide valve 13, passage 78, cavity 66 in slide valve 15, passage 65, through valve chamber 50 to passage 64, cavity 63 in slide valve 13 and passage 31.

Since fluid supplied to the empty brake cylinder 4 flows through valve chamber 50, the inner face of piston 16 is subject to the pressure of fluid supplied to the empty brake cylinder and when this pressure plus the pressure of spring 54 slightly exceeds the pressure of fluid acting on the opposite side of the piston, said piston will be shifted to its outer position, in which the slide valve 17 connects the auxiliary reservoir volume with the load brake cylinder through service port 57, passage 33, cavity 32, passage 78, cavity 66, passage 65, cavity 69 in slide valve 17, and passages 42 and 41.

It will now be seen that the piston 14 and the valve 15 operate according to the opposing pressures of the take-up brake cylinder and fluid pressure in valve chamber 30 for controlling the admission of fluid to the empty brake cylinder, while the piston 16 and the valve 17 operate according to the opposing pressures of the empty brake cylinder and the pressure in valve chamber 30 for controlling the supply of fluid to the load brake cylinder, and since the degree of pressure in valve chamber 30 corresponds with the degree of pressure in the brake pipe, a brake application is assured at the rear end of a long train, even where the brake pipe pressure may be less than the brake pipe pressure at the head end of the train.

In the above described operation, fluid at empty brake cylinder pressure is supplied through passage 51 and passage 79 to the top of valve piston 18 and when the pressure in the empty brake cylinder has increased to a predetermined degree, said valve piston is operated to cut off the exhaust port 62 from the empty brake cylinder, so that leakage from this brake cylinder is then prevented.

In a similar manner, since fluid at load brake cylinder pressure acts on the top of valve piston 19, through passage 80, which is connected to passage 42, when the load brake cylinder pressure has increased to a predetermined degree, the valve piston 19 is operated to cut off exhaust port 88 from the load brake cylinder.

Having now described my invention, what I claim as new, and desire to secure by Letters Patent, is:

1. In a load brake equipment, the combination with a brake pipe and two brake cylinders, of a valve device subject on one side to fluid pressure corresponding with the pressure in the brake pipe and on the opposite side to fluid at the pressure in one brake cylinder for controlling the supply of fluid to the other brake cylinder.

2. In a load brake equipment, the combination with a brake pipe and two brake cylinders, of a valve device subject on one side to fluid pressure corresponding with the pressure in the brake pipe and on the opposite side to the pressure of fluid supplied to one brake cylinder and a spring for controlling communication through which fluid is supplied to the other brake cylinder.

3. In a load brake equipment, the combination with a brake pipe and three brake cylinders, of a valve device subject on one side to fluid pressure corresponding with the brake pipe pressure and on the opposite side to the pressure of fluid supplied to the first brake cylinder for controlling the supply of fluid to the second brake cylinder, and a valve device subject on one side to fluid pressure corresponding with brake pipe pressure and on the opposite side to the pressure of fluid supplied to the second brake cylinder for controlling the supply of fluid to the third brake cylinder.

4. In a load brake equipment, the combination with a brake pipe, a brake cylinder for empty car braking and a brake cylinder for loaded car braking, of a triple valve device for controlling the supply of fluid to the empty brake cylinder and operated upon a gradual reduction in brake pipe pressure for venting fluid from the brake pipe to the load brake cylinder to effect quick service action.

5. In a load brake equipment, the combination with a brake pipe, a brake cylinder for empty car braking, and a take-up brake cylinder, of a valve device operated at a predetermined pressure in the take-up brake cylinder for establishing communication for supplying fluid to the empty brake cylinder and a valve piston for controlling an exhaust port to the empty brake cylinder and operated at a predetermined pressure in the take-up brake cylinder for cutting off said exhaust port from the empty brake cylinder.

6. In a load brake equipment, the combination with a brake pipe, a brake cylinder for empty car braking, a take-up brake cylinder, and a load brake cylinder, of a valve device subject to the pressure in the take-up brake cylinder for controlling communication for supplying fluid to the empty brake cylinder, a valve device subject to the pressure in the empty brake cylinder for controlling communication for supplying fluid to the load brake cylinder, a valve piston controlling an exhaust port to the empty brake cylinder and operated at a predetermined pressure in the take-up brake cylinder for cutting off said exhaust port from the empty brake cylinder, and a valve piston controlling an exhaust port to the load brake cylinder and operated at a predetermined pressure in the empty brake cylinder for cutting off said exhaust port from the load brake cylinder.

7. In a load brake equipment, the combination with a plurality of brake cylinders, of a valve device subject to the opposing pressures of one brake cylinder and a spring and operated at a predetermined brake cylinder pressure for closing an exhaust to another brake cylinder and at a predetermined reduction in brake cylinder pressure for opening said exhaust.

In testimony whereof I have hereunto set my hand.

THOMAS H. THOMAS.